United States Patent
Peng

(10) Patent No.: US 9,213,868 B2
(45) Date of Patent: Dec. 15, 2015

(54) ELECTRONIC DEVICE

(71) Applicant: HON HAI PRECISION INDUSTRY CO., LTD., New Taipei (TW)

(72) Inventor: Da-Yi Peng, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 0 days.

(21) Appl. No.: 14/310,078

(22) Filed: Jun. 20, 2014

(65) Prior Publication Data

US 2014/0374481 A1    Dec. 25, 2014

(30) Foreign Application Priority Data

Jun. 21, 2013    (CN) .......................... 2013 1 02469902

(51) Int. Cl.
*G06K 7/06* (2006.01)
*G06K 7/00* (2006.01)
*G06K 13/08* (2006.01)

(52) U.S. Cl.
CPC .......... *G06K 7/0056* (2013.01); *G06K 13/0875* (2013.01)

(58) Field of Classification Search
CPC ............ G06K 13/0875; G06K 7/0091; G06K 15/0216; G06K 7/0021; G06K 13/0893; G06K 7/006
See application file for complete search history.

(56) References Cited

U.S. PATENT DOCUMENTS 5,484,989 A * 1/1996 Kumar et al. .................. 235/435
2014/0372305 A1 * 12/2014 Ray et al. ........................ 705/44

* cited by examiner

*Primary Examiner* — Thien T Mai
(74) *Attorney, Agent, or Firm* — Novak Druce Connolly Bove + Quigg LLP

(57) ABSTRACT

An electronic device comprises a housing defining an inserting slit configured to receive a memory card, a printed circuit board configured to be installed within the housing, a card reader installed in the housing and electrically coupled to the printed circuit board, and an elastic cover coupled to the housing and configured to cover the inserting slit. The card reader is configured to be substantially adjacent to the inserting slit. The elastic cover defines a slot for guiding the memory card to a receiving portion of the card reader. The elastic cover is configured to deform and expose the memory card upon depression, so that the memory card is ejected out of the housing via the slot.

5 Claims, 4 Drawing Sheets

ELECTRONIC DEVICE

FIELD

The present disclosure generally relates to an electronic device, and particularly to an electronic device capable of accepting an external memory card.

BACKGROUND

An electronic device may include memory card slots for accepting memory cards such as secure digital memory cards and trans-flash cards.

BRIEF DESCRIPTION OF THE DRAWINGS

Implementations of the present technology will now be described, by way of example only, with reference to the attached figures, wherein.

DETAILED DESCRIPTION

The term "coupled" is defined as connected, whether directly or indirectly through intervening components, and is not necessarily limited to physical connections. The connection can be such that the objects are permanently connected or releasably connected. The term "outside" refers to a region that is beyond the outermost confines of a physical object. The term "inside" indicates that at least a portion of a region is partially contained within a boundary formed by the object. The term "substantially" is defined to be essentially conforming to the particular dimension, shape or other word that substantially modifies, such that the component need not be exact. For example, substantially cylindrical means that the object resembles a cylinder, but can have one or more deviations from a true cylinder. The term "comprising," when utilized, means "including, but not necessarily limited to"; it specifically indicates open-ended inclusion or membership in the so-described combination, group, series and the like.

Figure 1:
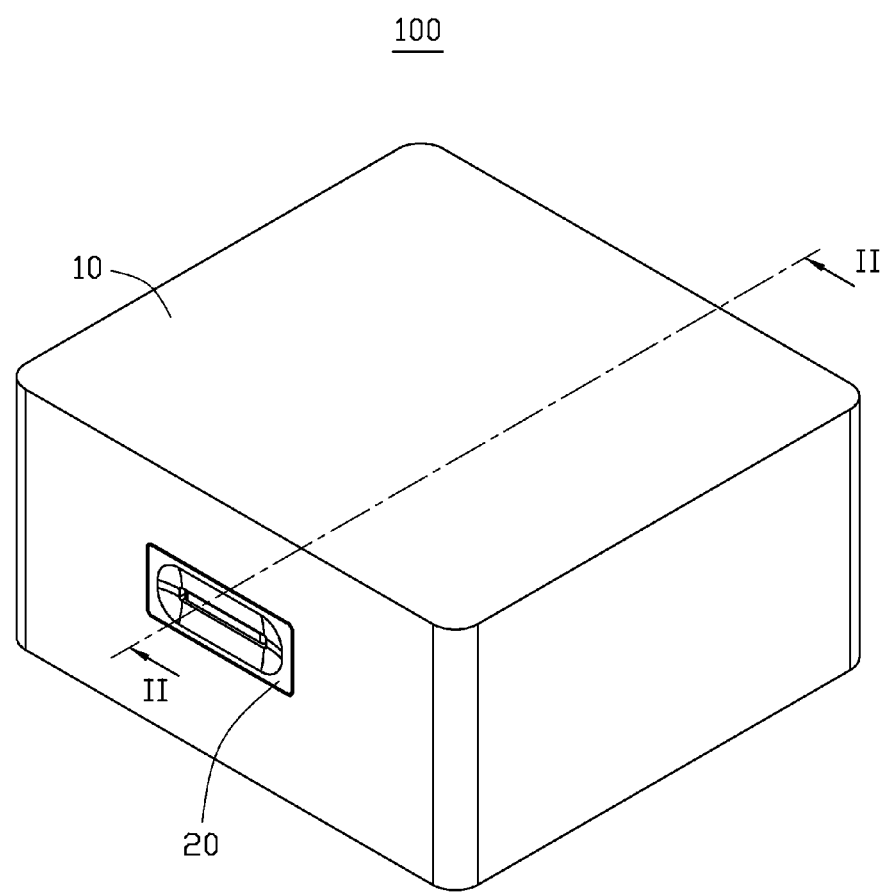
FIG. 1 shows an assembled, isometric view of an embodiment of an electronic device, including an elastic cover.
Figure 2:
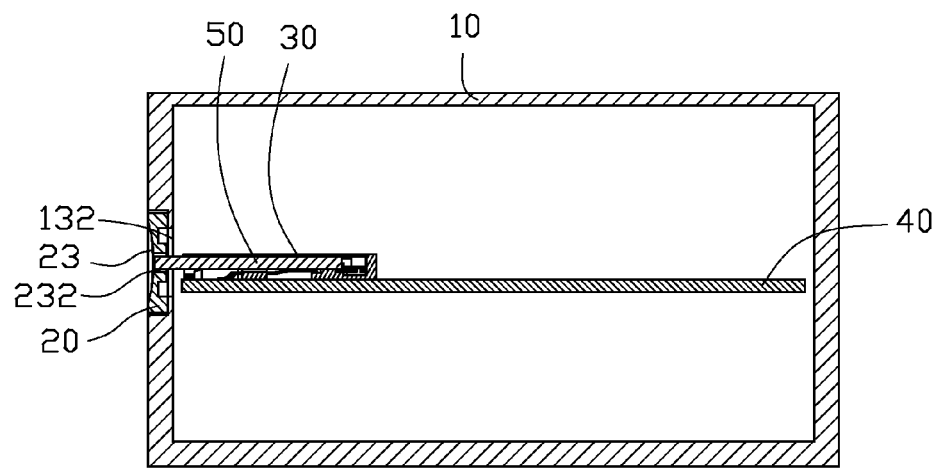
FIG. 2 shows a cross-sectional view of the electronic device of FIG. 1 taken along line II-II.

FIGS. 1 and 2 illustrate an embodiment of an electronic device 100. The electric device can include a housing 10, an elastic cover 20 assembled to the housing 10, a card reader 30, and a printed circuit board 40. The card reader 30 and the printed circuit board 400 can be both received in the housing 10, and the card reader 30 can be electrically coupled to the printed circuit board 40. When a memory card 50 is inserted into the card reader 30 through the elastic cover 20, the card reader 30 can read data from the memory card 50 and transmit the read data to the printed circuit board 40 for processing.

Figure 3:
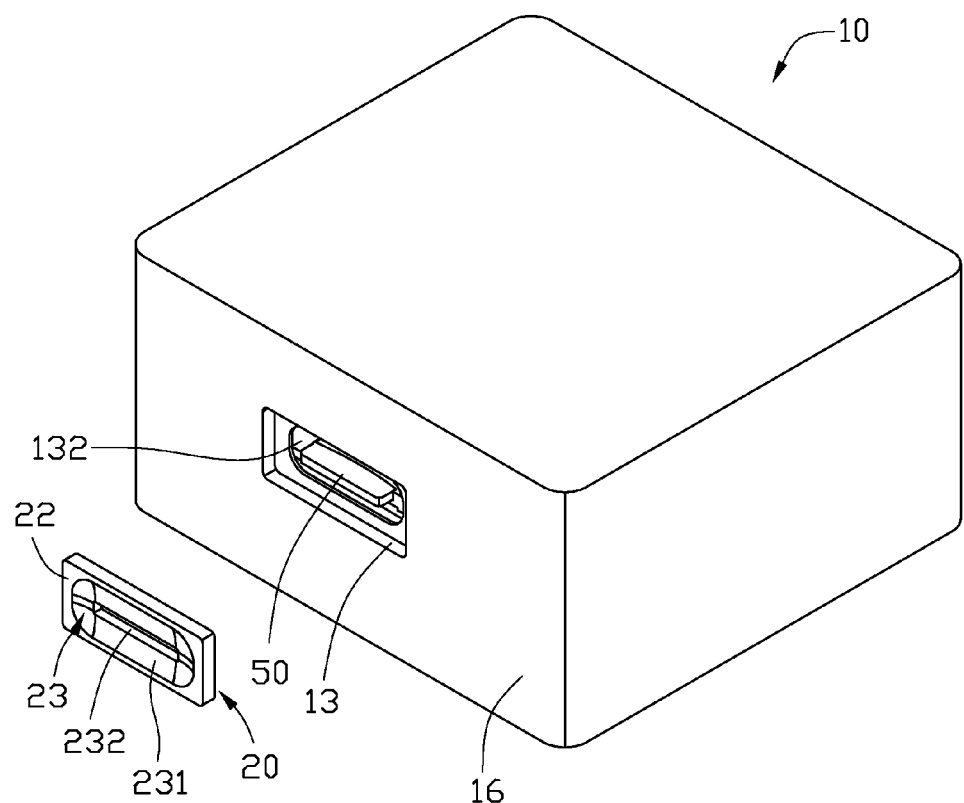
FIG. 3 shows an exploded, isometric view of the electronic device of FIG. 1.
Figure 4:
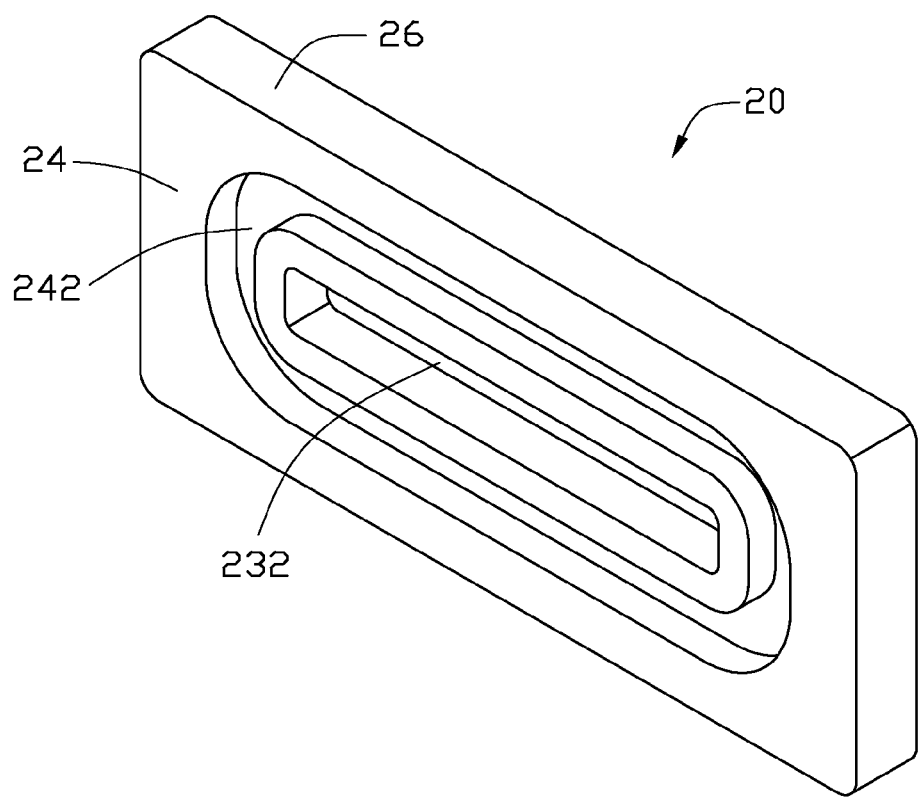
FIG. 4 shows an enlarged, isometric view of the elastic cover of FIG. 1.

FIGS. 3 and 4 illustrate that the housing 10 can be substantially rectangular and include a plurality of sidewalls 16. The housing 10 can define a substantially rectangular receiving groove 13 in one of the sidewalls 16, and an inserting slit 132 can extend from a bottom of the receiving groove 13 into an interior space of the housing 10.

The elastic cover 20 can be substantially rectangular. The elastic cover 20 can be received in the receiving groove 13 and cover the inserting slit 132. The elastic cover 20 can be deformed. The elastic cover 20 can include a first surface 22, a second surface 24 opposite to the first surface 22, and four side surfaces 26 connected between the first surface 22 and the second surface 24. The first surface 22 can be substantially parallel to the sidewall 16 that defines the receiving groove 13. The second surface 24 can resist the bottom of the receiving groove 13. The four side surfaces 26 can resist sides of the receiving groove 13. The elastic cover 20 can define a pressing groove 23 in a substantially central portion of the first surface 22. A shape of the pressing groove 23 can be substantially the same as a shape of the inserting slit 132. The pressing groove 23 can include an arced bottom surface 231. A strip-shaped slot 232 can be defined in the arced bottom surface 231. The arced bottom surface 231 can be gradually recessed along a direction from a periphery of the pressing groove 23 to the slot 232, and a shape of the arced bottom surface 231 can match a shape of a human finger. The slot 232 is configured for guiding the memory card 50 to insert into the card reader 30. The elastic cover 20 can define an annular groove 242 in the second surface 24. The annular groove 242 surrounds the slot 232, and an outline of the annular groove 242 can match an outline of the pressing groove 23. Thus, the arced bottom surface 231 of the pressing groove 23 can be deformed when the pressing groove 23 is pressed.

In the illustrated embodiment, the second surface 24 of the elastic cover 20 can be coated with an adhesive layer, so that the elastic cover 20 can be adhered to the bottom of the receiving groove 13. In at least one embodiment, the elastic cover 20 can be made of rubber. In other embodiments, the elastic cover 20 can be made of metal or other elastic materials, and can be fixed in the receiving groove 13 with hooks. For example, sides of the receiving groove 13 can be equipped with hooks, and the side surface 26 of the elastic cover 20 can define latching grooves corresponding to the hooks.

In operation, the memory card 50 can be inserted into and latch with the card reader 30 through the slot 232 and the inserting slit 132. The slot 232 can support and guide the memory card 50 to insert into the card reader 30. The arced bottom surface 231 of the pressing groove 23 can be pressed to deform towards the second surface 24, thereby exposing the memory card 50 out of the arced bottom surface 231 through the slot 232. The memory card 50 can be ejected out of the slot 232 by being pressed by a user.

In other embodiments, the pressing groove 23 can be omitted, such that the slot 232 is defined in the first surface 22 of the elastic cover 20, as long as the first surface 22 of the elastic cover 20 can be deformed towards the second surface 24 to expose the memory card 50 out of the first surface 22.

While the present disclosure has been described with reference to particular embodiments, the description is illustrative of the disclosure and is not to be construed as limiting the disclosure. Therefore, those of ordinary skill in the art can make various modifications to the embodiments without departing from the true spirit and scope of the disclosure, as defined by the appended claims.

What is claimed is:

1. An electronic device comprising:
   a housing defining an inserting slit configured to receive a memory card;
   a printed circuit board configured to be installed within the housing;
   a card reader installed in the housing and electrically coupled to the printed circuit board, wherein the card reader is configured to be substantially adjacent to the inserting slit;
   an elastic cover coupled to the housing and configured to cover the inserting slit, the elastic cover comprising a first surface, a second surface opposite to the first surface, a pressing groove defined in the first surface, a slot defined extending through the first and second surfaces in a bottom of the pressing groove, and an annular groove defined in the second surface surrounding the slot;

wherein the slot is configured for guiding the memory card to a receiving portion of the card reader;

wherein the elastic cover is configured to deform and expose the memory card upon depression, so that the memory card is ejected out of the housing via the slot;

wherein outlines of the pressing groove and the annular groove match with the outline of the inserting slit, so that the elastic cover is easily deformed upon depression to expose the memory card.

2. The electronic device of claim 1, wherein the inserting slit is defined in the bottom of the receiving groove, and the elastic cover is fixed in the receiving groove.

3. The electronic device of claim 2, wherein the elastic cover is configured to adhere to the bottom of the receiving groove.

4. The electronic device of claim 1, wherein the elastic cover is made of rubber.

5. The electronic device of claim 1, wherein the pressing groove comprises an arced bottom surface defining the slot and gradually recessed along a direction from a periphery of the pressing groove to the slot; the shape of the arced bottom surface matches the shape of a human finger.

* * * * *